(12) United States Patent
Okubo (10) Patent No.: US 11,719,407 B2
(45) Date of Patent: Aug. 8, 2023

(54) VEHICLE LIGHT

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

(*) Notice: Subject to any disclaimer, the term of this patent is extended or adjusted under 35 U.S.C. 154(b) by 45 days.

(21) Appl. No.: 17/618,158

(22) PCT Filed: Jun. 10, 2020

(86) PCT No.: PCT/JP2020/022875
§ 371 (c)(1),
(2) Date: Dec. 10, 2021

(87) PCT Pub. No.: WO2020/250937
PCT Pub. Date: Dec. 17, 2020

(65) Prior Publication Data
US 2022/0221123 A1      Jul. 14, 2022

(30) Foreign Application Priority Data

Jun. 12, 2019 (JP) ................................. 2019-109667

(51) Int. Cl.
*F21S 41/43* (2018.01)
*F21S 41/25* (2018.01)
*F21S 41/20* (2018.01)

(52) U.S. Cl.
CPC ............... *F21S 41/43* (2018.01); *F21S 41/25* (2018.01); *F21S 41/285* (2018.01)

(58) Field of Classification Search
None
See application file for complete search history.

(56) References Cited

FOREIGN PATENT DOCUMENTS

JP      2012-530263 A1      11/2012

OTHER PUBLICATIONS

International Search Report dated Aug. 18, 2020 in PCT/JP2020/022875 filed Jun. 10, 2020, 2 pages.

*Primary Examiner* — Elmito Breval
(74) *Attorney, Agent, or Firm* — Oblon, McClelland, Maier & Neustadt, L.L.P.

(57) ABSTRACT

A vehicle light includes: a light source; a light condensing lens condensing a light emitted from the light source; and an irradiation pattern forming member having an irradiation slit for allowing the light to partially pass through, and that forms the passing light into an irradiation pattern. The irradiation slit has a farthest location that corresponds to a farthest portion projected at a farthest position in the irradiation pattern and a nearest location that corresponds to a nearest portion projected at a nearest position in the irradiation pattern. The light condensing lens, on the irradiation pattern forming member, makes the farthest location brightest and the nearest location darkest in an upper-lower direction, and diffuses the light emitted from the light source more in a width direction, which is orthogonal to an optical axis direction and to the upper-lower direction, than in the upper-lower direction.

8 Claims, 9 Drawing Sheets

VEHICLE LIGHT

TECHNICAL FIELD

The present disclosure relates to a vehicle light.

BACKGROUND ART

A vehicle light is considered to form an irradiation pattern on a road surface around the vehicle.

Here, such a vehicle light is mounted on a vehicle and projects the irradiation pattern in a direction inclined relative to the road surface around the vehicle. Due to this, with the vehicle light, the distance from the installation position of the vehicle to the road surface varies depending on the position in the irradiation pattern, so that the irradiation pattern's part away from the vehicle becomes extremely dark.

Then, it has been considered that a vehicle light uses a micro array lens as a projection lens for projecting a light from a light source (see, for example, Patent Document 1). Then, adjusting a focal position of each lens portion in the micro array lens according to the distance to the road surface in the irradiation pattern can make the luminance distribution in the irradiation pattern as desired.

CITATION LIST

Patent Literature

PTL 1: Patent No. 2012-530263

SUMMARY OF THE INVENTION

Problems to be Solved by the Invention

However, the above technology requires use of the micro array lens with the focal position of each lens portion adjusted according to the distance to the road surface, which results in a complicated configuration.

The present disclosure has been made in view of the above circumstance, and it is an object of the present invention to provide a vehicle light which, while having a simple configuration, can make a desired luminance distribution in an irradiation pattern.

Means for Solving the Problem

A vehicle light according to the present disclosure includes: a light source; a light condensing lens that condenses a light emitted from the light source; an irradiation pattern forming member that has an irradiation slit for allowing the light, which is condensed by the light condensing lens, to partially pass through, and that forms the passing light into an irradiation pattern; and a projection lens that projects the irradiation pattern, which is formed by the irradiation pattern forming member, onto a road surface, wherein the irradiation slit has a farthest location that corresponds to a farthest portion projected at a farthest position in the irradiation pattern and a nearest location that corresponds to a nearest portion projected at a nearest position in the irradiation pattern, and the light condensing lens, on the irradiation pattern forming member, makes the farthest location brightest and the nearest location darkest in an upper-lower direction, and diffuses the light emitted from the light source more in a width direction, which is orthogonal to an optical axis direction and to the upper-lower direction, than in the upper-lower direction.

Effect of the Invention

The vehicle light of the present disclosure, while having a simple configuration, can make a desired luminance distribution in the irradiation pattern.

MODE FOR CARRYING OUT THE INVENTION

Figure 1:
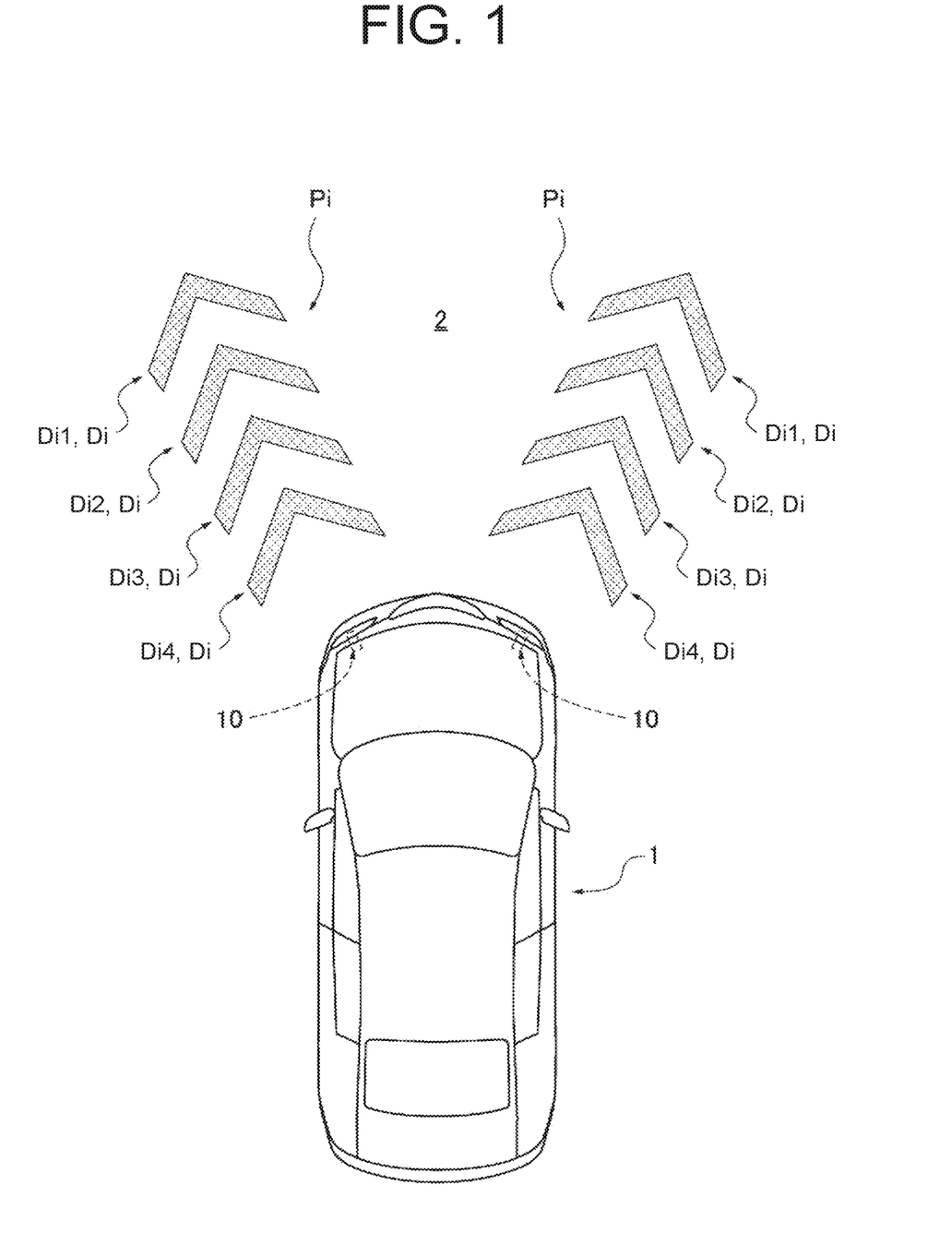
FIG. 1 is an explanatory view illustrating how a vehicle light according to the present disclosure is mounted on a vehicle thereby to form an irradiation pattern.

Hereinafter, Example 1 of a vehicle light 10 as an example of a vehicle light according to the present disclosure will be described with reference to the drawings. In order to make it easier to understand how the vehicle light 10 is installed, FIG. 1 illustrates the vehicle light 10 in relation to the vehicle 1, with emphasis on the vehicle light 10, which does not necessarily correspond to the actual appearance.

Example 1

The vehicle light 10 of Example 1, which is an embodiment of a vehicle light according to the present disclosure, will be described using FIGS. 1 to 12. As illustrated in FIG. 1, the vehicle light 10 of Example 1 is used as a light of the vehicle 1 such as a car, and forms an irradiation pattern Pi on a road surface 2 around the vehicle 1 separately from a front light provided on the vehicle 1. Here, the periphery of the vehicle 1 always includes a proximity area nearer to the vehicle 1 than the front light area illuminated by the front light provided on the vehicle 1, and may partially include the front light area. In Example 1, the vehicle light 10 is located in a light chamber on both the left and right sides of the front portion of the vehicle. The light chamber is so formed that an open front end of a lamp housing is covered with an outer lens. The vehicle light 10 is provided in the light chamber with an optical axis La inclined relative to the road surface 2. This is due to the fact that the light chamber is located higher than the road surface 2. In the following description, in the vehicle light 10, a direction in which the optical axis La extends, which is the direction to irradiate the light, is referred to as an optical axis direction (Z in the drawing), a vertical direction seen when the optical axis direction is in a state of being along a horizontal plane is referred to as an upper-lower direction (Y in the drawing), and a direction (horizontal direction) orthogonal to the optical axis direction and the upper-lower direction is referred to as a width direction (X in the drawing) (see FIG. 2, etc.).

The vehicle light 10 has a light source, a light condensing lens that condenses the light emitted from the light source, an irradiation pattern forming member that is provided with an irradiation slit which partially passes the light condensed by the light condensing lens and that forms the passing light into an irradiation pattern, and a projection lens that projects, on the road surface, the irradiation pattern formed by the irradiation pattern forming member. An example of the irradiation pattern forming member includes a filter.

Figure 2:
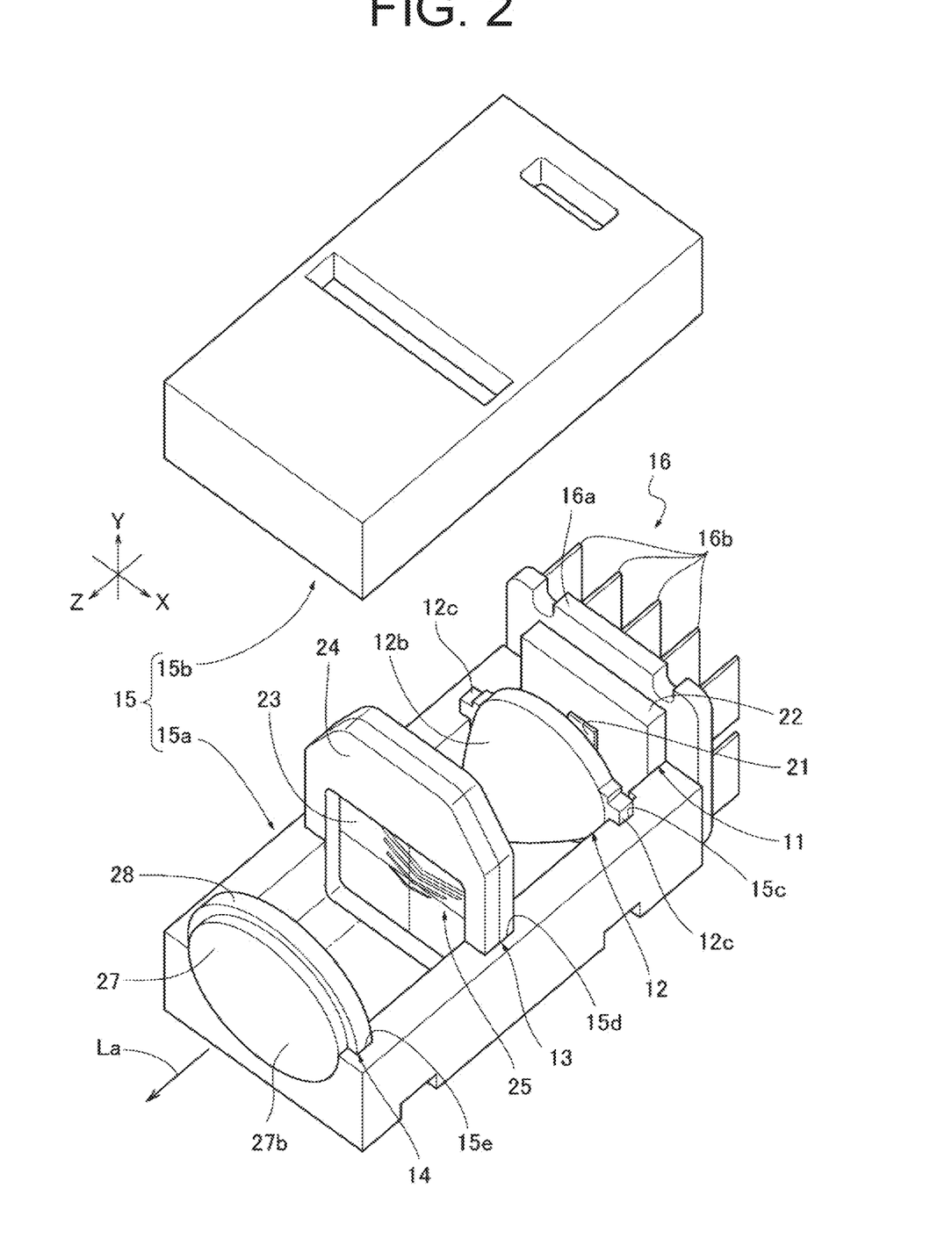
FIG. 2 is an explanatory view illustrating the configuration of the vehicle light of Example 1.

As illustrated in FIG. 2, in the vehicle light 10, a light source portion 11, a light condensing lens 12, a filter 13, and a projection lens 14 are housed in a housing 15, and a heat radiation member 16 is attached to the housing 15, constituting a projector-type road surface projection unit. The housing 15 includes a lower member 15a and an upper member 15b, and the upper member 15b is fitted to the lower member 15a with each of the above members (11 to 14) installed in the lower member 15a. In the housing 15, a light condensing lens groove 15c to fit the light condensing lens 12 therein, a filter groove 15d to fit the filter 13 therein, and a projection lens groove 15e to fit the projection lens 14 therein are provided (illustrated only on the lower member 15a side).

In the light source portion 11, a light source 21 is mounted on a substrate 22. The light source 21 is composed of a light emitting element such as an LED (Light Emitting Diode), and is provided with an emission optical axis coinciding with the optical axis La. In Example 1, the light source 21 emits amber monochromatic light (having a single peak in a graph in which the longitudinal axis is the light amount and the horizontal axis is the wavelength) in a Lambertian distribution with the optical axis La centered. The light source 21 is not limited to the configuration of Example 1, as long as the color (wavelength band), mode of distribution, and the number of colors (the number of peaks in the graph described above) in the emitted light can be set as appropriate.

The substrate 22 lights the light source 21 by appropriately supplying the power from a lighting control circuit. In a state of being mounted on an installation face (a light source installation portion 16a) of the heat radiation member 16, the substrate 22 is housed in the rear end portion of the housing 15 (the end portion opposite to the projection lens groove 15e in the optical axis direction).

The light condensing lens 12 condenses the light emitted from the light source 21 and condenses the light on the filter 13. The light condensing lens 12 is formed by a biconvex lens in Example 1, and an incident face 12a and an emission face 12b (see FIG. 4, etc.) are each a free curved face. The optical setting in the light condensing lens 12 will be described below. In the light condensing lens 12, mount flange portions 12c are provided at both ends in the width direction. Each of the mount flange portions 12c can be fitted into the light condensing lens groove 15c of the housing 15. The light condensing lens 12 has a lens axis extending in the optical axis direction. That lens axis is an optical axis line that passes through the position of the largest thickness in the optical axis direction in the light condensing lens 12. In the light condensing lens 12, when the mount flange portion 12c is fitted into the light condensing lens groove 15c, the extending direction of the lens axis is caused to coincide with the optical axis La. The incident face 12a and the emission face 12b may be convex or concave, and are not limited to the configuration of Example 1, as long as the light condensing lens 12 is a convex lens and satisfies the optical setting described below.

The filter 13 transmits the light from the light source 21 condensed by the light condensing lens 12 thereby to form the irradiation pattern Pi. As illustrated in FIG. 1 and the like, the irradiation pattern Pi has four irradiation drawing patterns Di aligned at equal intervals in a direction away from the vehicle 1. Each irradiation drawing pattern Di is of a large open V-shape and is of a substantially equal size each other. When each irradiation drawing pattern Di is individually illustrated, the one farthest from the vehicle 1 is designated as a first irradiation drawing pattern a1, and the second, third, and fourth irradiation drawing patterns Di2, Di3, and Di4, respectively, are designated as they sequentially approach the vehicle 1 from there. Due to this, in the irradiation pattern Pi, the first irradiation drawing pattern Di1 is the farthest portion and the fourth irradiation drawing pattern Di4 is the nearest portion. The irradiation pattern Pi can be made to look like an arrow pointing in a predetermined direction from the vehicle 1 by arranging each of the four irradiation drawing patterns Di with the vertices of the V-shaped pattern positioned in a substantially straight line. In Example 1, the vehicle light 10 is provided at each of the left and right tip portions of the vehicle 1, and forms the irradiation pattern Pi on the surrounding road surface 2 so as to point diagonally toward the front side of the vehicle 1 in the front/rear direction and toward the outside in the width direction. This irradiation pattern Pi can inform the surroundings of the direction in which the vehicle 1 is proceeding, and is formed in conjunction with a turn lamp in Example 1.

Figure 3:
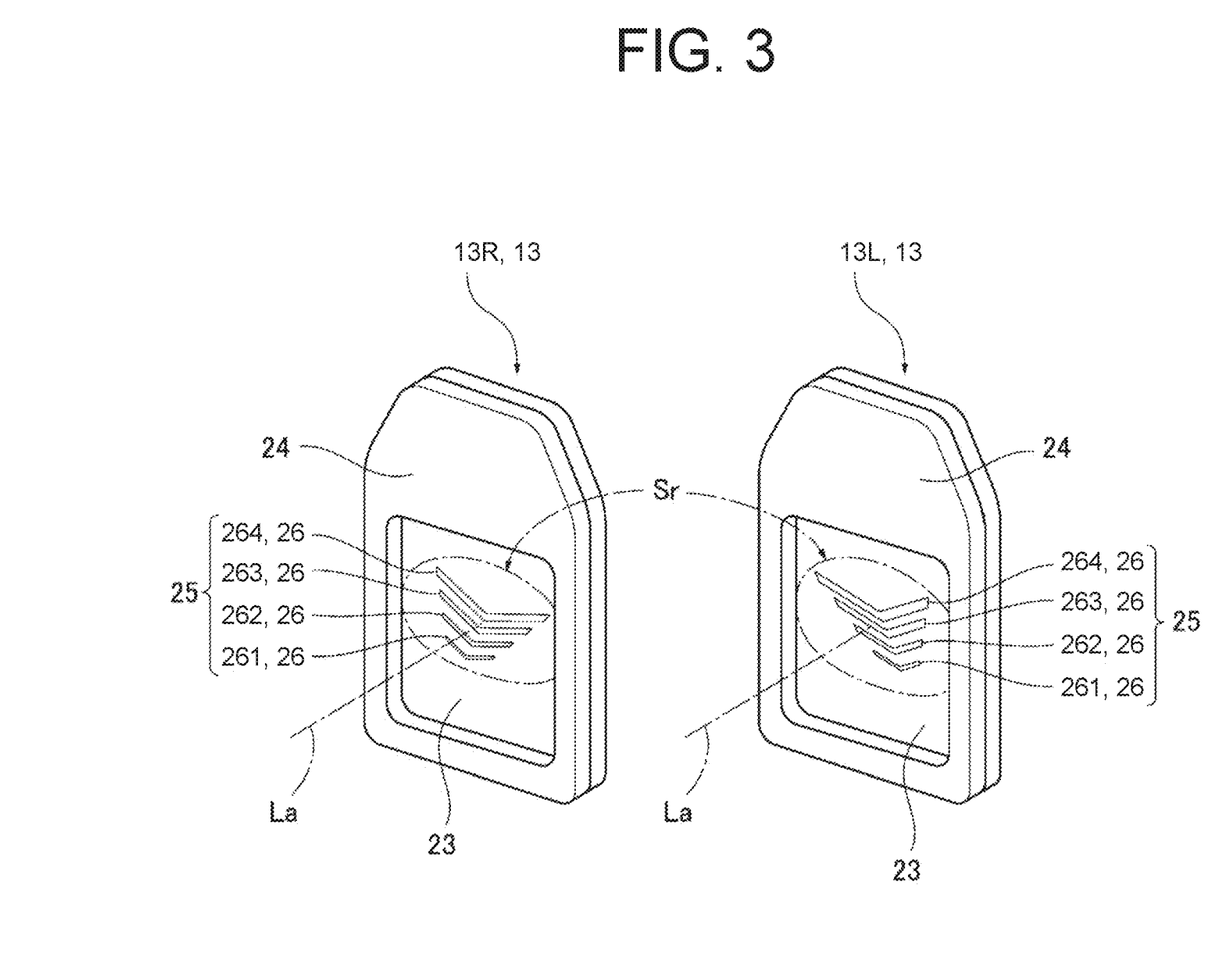
FIG. 3 is an explanatory view illustrating the configuration of a filter.

In the filter 13, as illustrated in FIG. 3, a filter portion 23 is provided in a filter frame portion 24. The filter frame portion 24 is in the form of a frame surrounding the filter portion 23 and can be fitted into the filter groove 15d of the housing 15 (see FIG. 1).

The filter portion 23 is basically formed of a plate-shaped film member that blocks the transmission of light, and is provided with an irradiation slit 25. The irradiation slit 25 partially transmits the light from the light source 21 condensed by the light condensing lens 12 thereby to form the light into the shape of the irradiation pattern Pi. The irradiation slit 25 is caused to correspond to the irradiation pattern Pi, and, in Example 1, is composed of four slit portions 26. The four slit portions 26 correspond, one-to-one, to the four irradiation drawing patterns Di, and are each made in the form of a V-shape that largely opens as each irradiation drawing pattern Di, and are made to have different sizes and different intervals from each other, unlike each irradiation drawing pattern Di. In detail, the vehicle light 10 is provided with the optical axis La inclined relative to the road surface 2, so that the distance from the filter 13 and the projection lens 14 to the road surface 2 differs, so that with a projection on the road surface 2 by the projection lens 14, each slit portion 26 (each irradiation drawing pattern Di which is the light transmitted therethrough) has a size and an interval which correspond to the distance. Due to this, the size and interval of each slit portion 26 are set according to the distance to the road surface 2 so that each slit portion 26 (each irradiation drawing pattern Di) has substantially equal size and substantially equal interval on the road surface 2.

Further, each of the slit portions 26 is in a positional relation of a rotational symmetry around the optical axis La, relative to the positional relation of each irradiation drawing pattern Di of the irradiation pattern Pi. In detail, the vehicle light 10 is provided with each slit portion 26 in a positional relation of a rotational symmetry around the optical axis La relative to each irradiation drawing pattern Di, so that each irradiation drawing pattern Di is in a targeted positional relation on the road surface 2 because the projection lens 14 reverses and projects the filter 13 (irradiation slit 25) on the road surface 2. Due to this, concerning each slit portion 26, a first slit portion 261 at the lowermost side in the upper-lower direction is the farthest location that corresponds to the first irradiation drawing pattern Di1 (farthest portion) of the irradiation pattern Pi. Then, concerning each slit portion 26, a second slit portion 262 thereabove corresponds to the second irradiation drawing pattern Di2, a third slit portion 263 thereabove corresponds to the third irradiation drawing pattern Di3, and an uppermost fourth slit portion 264 is the nearest location that corresponds to the fourth irradiation drawing pattern Di4 (nearest portion) of the irradiation pattern Pi. In the filter 13 of Example 1, in the upper-lower direction, the third slit portion 263 is provided across the optical axis La, the fourth slit portion 264 is provided thereabove, and the second slit portion 262 and the first slit portion 261 are provided below the third slit portion 263.

Herein, as illustrated in FIG. 1, the vehicle light 10 is designed to form, on both right and left sides of the vehicle 1, the irradiation pattern Pi symmetrically with respect to a plane orthogonal to the width direction of the vehicle 1. Due to this, as illustrated in FIG. 3, the vehicle light 10 has two filters, that is, a filter 13R for the right side when installed in front of the right side of the vehicle 1, and a filter 13L for the left side when installed in front of the left side of the vehicle 1. The two filters 13R and 13L have the same configuration as each other, except that the irradiation slit 25 (each slit portion 26 thereof) is provided symmetrical with respect to the plane orthogonal to the width direction. The filter 13 (light transmitted through each slit portion 26 of the irradiation slit 25) is projected on the road surface 2 by the projection lens 14.

As illustrated in FIG. 2, the projection lens 14 has a lens body portion 27, which is a circular convex lens when viewed in the optical axis direction, and a flange portion 28 surrounding a periphery of the lens body portion 27. In Example 1, the lens body portion 27 is a free curved face in which an incident face 27a and an emission face 27b are each a convex face. The optical setting in the lens body portion 27 of the projection lens 14 will be described below. The projection lens 14 has a lens axis extending in the optical axis direction. This lens axis is an optical axis that passes through the position where the thickness in the optical axis direction is the largest in the lens body portion 27. The incident face 27a and the emission face 27b each may be convex or concave, and are not limited to the configuration of Example 1, as long as the lens body portion 27 is a convex lens and satisfies the optical setting described below.

The flange portion 28 protrudes from the lens body portion 27 in a radial direction with the optical axis La centered, and extends around the entire circumference in a circumferential direction with the optical axis La centered. The flange portion 28 is capable of being fitted into the projection lens groove 15e of the housing 15. Concerning the projection lens 14, when the flange portion 28 is fitted into the projection lens groove 15e, the extending direction of the lens axis is caused to coincide with the optical axis La.

The heat radiation member 16 is a heat sink member for releasing, to the outside, the heat generated at the light source 21, and is formed of an aluminum die-casting or resin having thermal conductivity. This heat radiation member 16 has a light source installation portion 16a in which the light source portion 11 (substrate 22 thereof) is installed, and a plurality of heat radiation fins 16b. To the outside from each heat radiation fin 16b, the heat radiation member 16 radiates the heat generated by the light source portion 11 installed at the light source installation portion 16a.

The vehicle light 10 is assembled as follows with reference to FIG. 2. First, the light source 21 is mounted on the substrate 22 thereby to assemble the light source portion 11, and the light source portion 11 is fixed to the light source installation portion 16a of the heat radiation member 16. Then, in the lower member 15a of the housing 15, the light condensing lens 12 is fitted into the light condensing lens groove 15c, the filter 13 is fitted into the filter groove 15d, and the projection lens 14 is fitted into the projection lens groove 15e. Then, with the emission optical axis of the light source 21 coincided with the optical axis La and positioned, the light source installation portion 16a of the heat radiation member 16 is fixed to the rear end of the lower member 15a of the housing 15 while the substrate 22 is housed in the rear end portion of the lower member 15a. Then, fitting the upper member 15b on the upper side of the lower member 15a mounts the heat radiation member 16 while housing the light source portion 11, the light condensing lens 12, the filter 13, and the projection lens 14 in the housing 15. With this, the light condensing lens 12, the filter 13, and the projection lens 14 are arranged on the optical axis La of the light source 21 of the light source portion 11 in the above order from the light source 21 side in a predetermined positional relation, and the heat radiation member 16 is fixed to the light source portion 11 thereby to assemble the vehicle light 10.

The vehicle light 10 is installed in the light chamber in a state in which the optical axis La is inclined relative to the road surface 2 around the vehicle 1 while being directed diagonally to the front side outside the vehicle 1 (see FIG. 1). The vehicle light 10 can turn the light source 21 on and off as appropriate by supplying, from the substrate 22 to the light source 21, the power from the lighting control circuit. The light from the light source 21 is condensed by the light condensing lens 12 thereby to irradiate the filter 13, and after passing through the irradiation slit 25 (each slit portion 26) thereof, is projected by the projection lens 14 thereby to form, on the road surface 2, the irradiation pattern Pi in which the four irradiation drawing patterns Di are arranged in a substantially straight line.

Next, the optical setting of the light condensing lens 12 will be described using FIGS. 4 to 7. FIG. 7 shows that the darker the color, the relatively brighter, and the lighter the color, the relatively darker. First, the light condensing lens 12 basically irradiates within a setting range Sr (see FIG. 3) in the filter 13 by condensing the light from the light source

21. The setting range Sr is, in Example 1, a range in which the irradiation slits 25 (each slit portion 26 thereof) of both the filter 13R for the right side and the filter 13L for the left side are provided, that is, a range covering the irradiation slits 25 of the filters 13R and 13L for both the left and right sides. The setting range Sr is an elliptical shape with the optical axis La at a center thereof (see FIG. 7), and the light condensing lens 12 is also an elliptical shape with the optical axis La at a center thereof in accordance with the setting range Sr. Note that the setting range Sr is not limited to the configuration of Example 1, as long as the shape of the setting range Sr is set according to the shape of the irradiation slit 25, and the shape of the light condensing lens 12 is be set according to the setting range Sr. In the following, a direction orthogonal to the optical axis La is defined as a radial direction.

Figure 4:
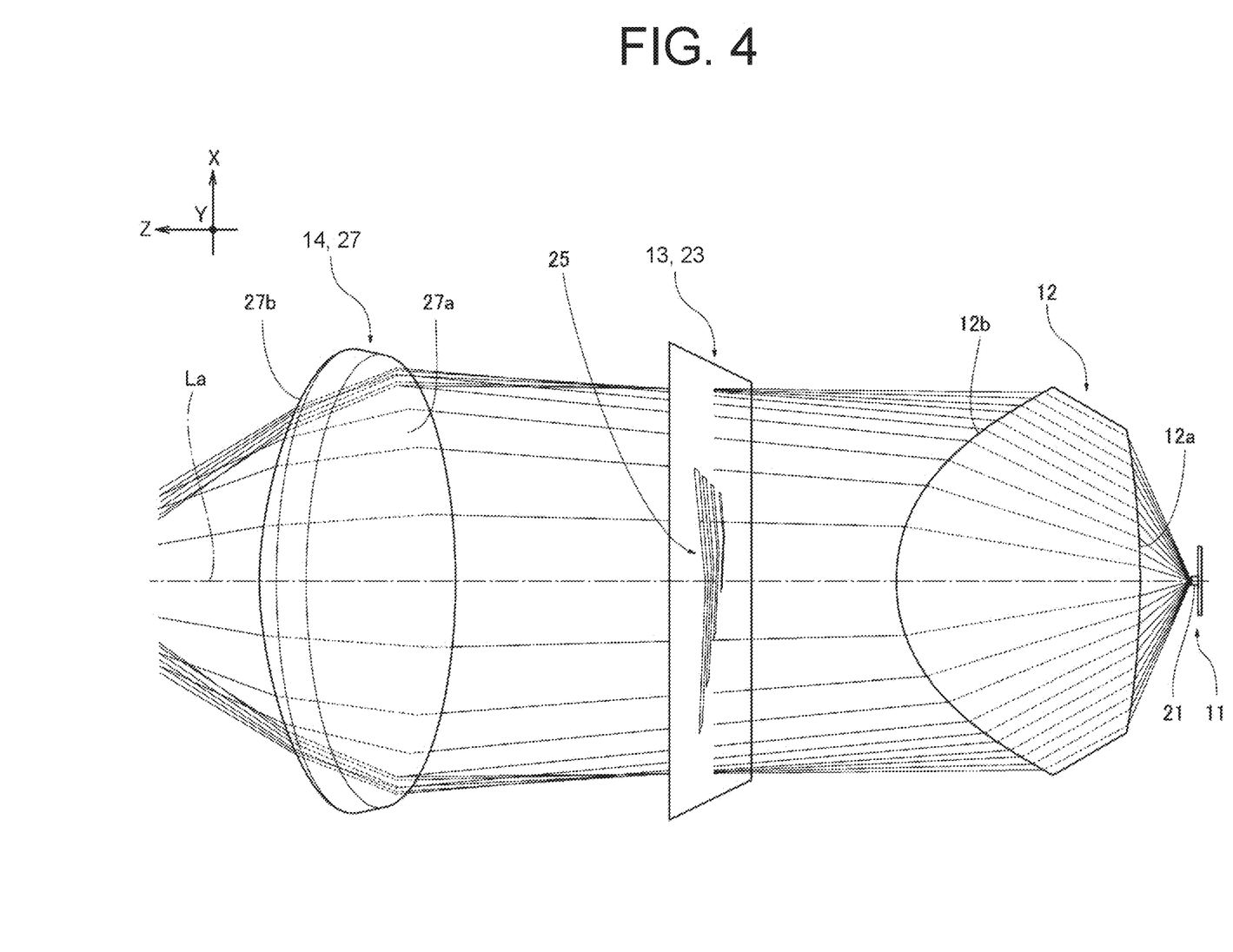
FIG. 4 is an explanatory view illustrating the progression of the light which passed through a light condensing lens on a transverse cross-section including the optical axis direction and the width direction in the vehicle light.

As illustrated in FIG. 4, in a transverse cross-section including the optical axis direction and the width direction, within the range from the emission face 12b to the filter 13, the light condensing lens 12, concerning the light from the light source 21, diffuses a light flux passing near the optical axis La in the radial direction, and parallelizes the light flux passing through the position away from the optical axis La in the radial direction. That is, the light condensing lens 12 diffuses the light near the optical axis La where the light amount is high due to being the Lambertian distribution, and condenses the light as outward from near the optical axis La. Then, in the transverse cross-section, that is, in the width direction, the light condensing lens 12 substantially evenly diffuses the light from the light source 21 within the setting range Sr of the filter 13, so that the light amount distribution becomes substantially equal.

Figure 5:
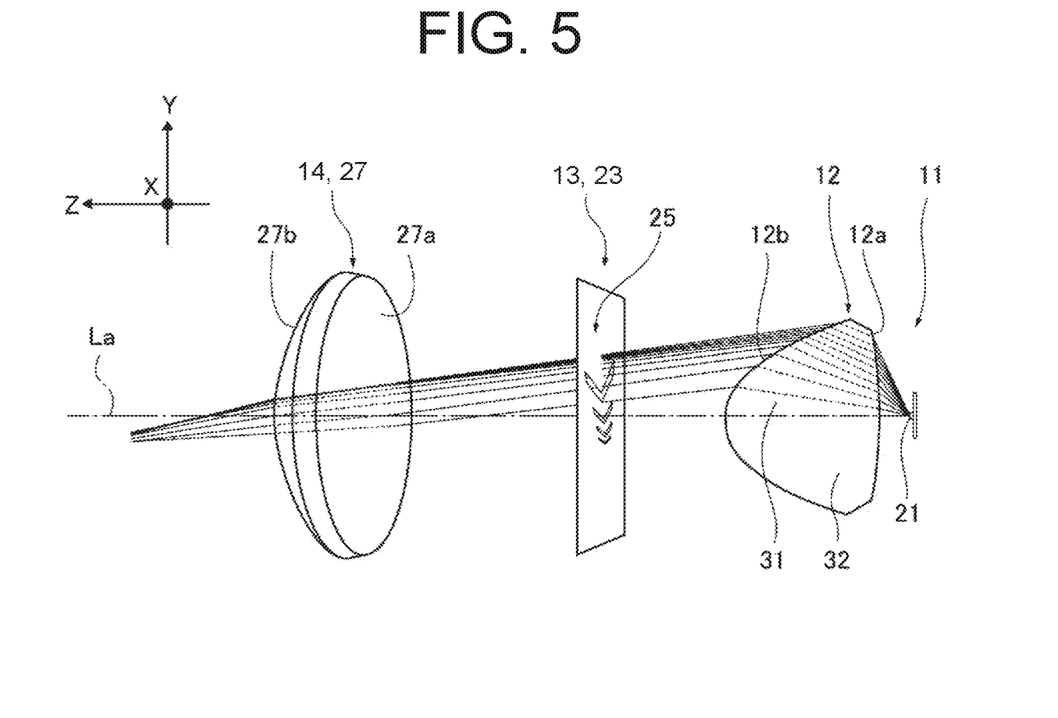
FIG. 5 is an explanatory view illustrating the progression of the light which passed through an upper lens portion of the light condensing lens in a longitudinal cross-section including the optical axis in the vehicle light.
Figure 6:
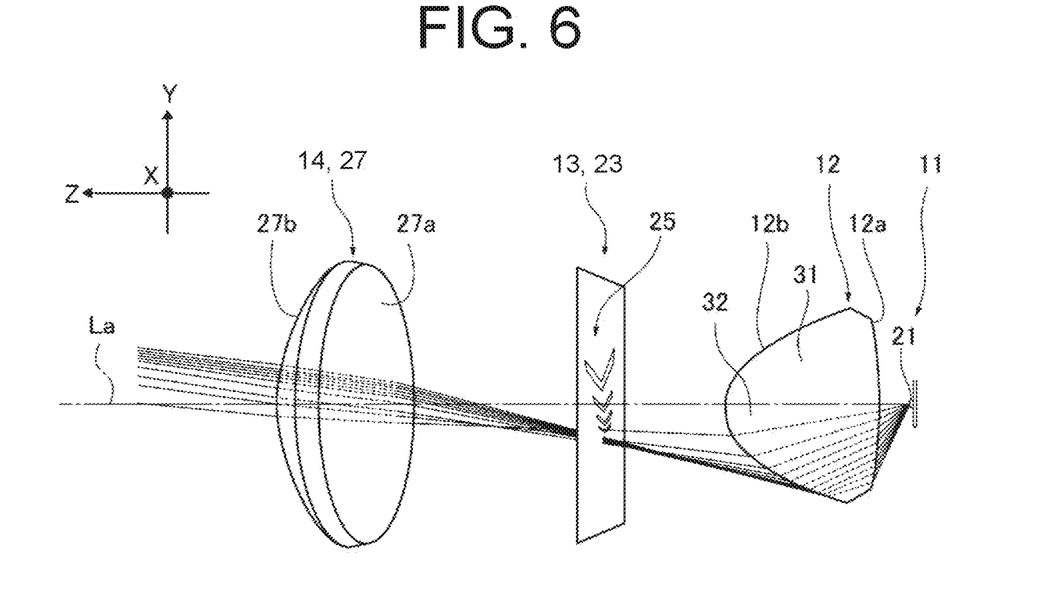
FIG. 6 is an explanatory view illustrating the progression of the light which passed through a lower lens portion of the light condensing lens in the longitudinal cross-section including the optical axis in the vehicle light.
Figure 7:
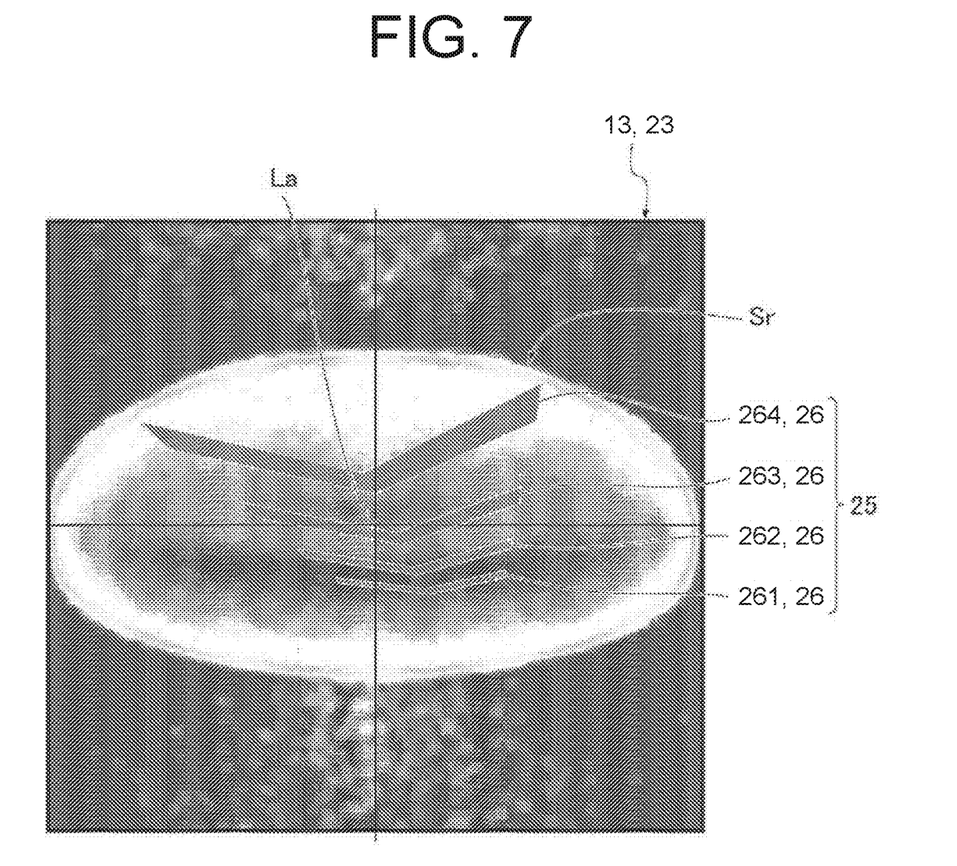
FIG. 7 is an explanatory view illustrating a light flux distribution on the filter.

As illustrated in FIGS. 5 and 6, the light condensing lens 12 is a free curved face including an upper lens portion 31 and a lower lens portion 32 in the upper-lower direction with the optical axis La at the center. The upper lens portion 31 condenses the light from the light source 21 so as to cause the light to intersect with the optical axis La in a longitudinal cross-section including the optical axis direction and the upper-lower direction, as illustrated in FIG. 5. The upper lens portion 31 causes at least the light flux near the optical axis La of the rays of light from the light source 21 to intersect with the optical axis La at the most filter 13 side, than other light fluxes, between the filter 13 and the projection lens 14. Then, the upper lens portion 31 causes the majority of the light fluxes, excluding the light flux near the optical axis La, to intersect with the optical axis La beyond the projection lens 14. As long as causing at least the light flux near the optical axis La to intersect with the optical axis La at the most filter 13 side, than other light fluxes, between the filter 13 and the projection lens 14, the upper lens portion 31 may cause any light flux other than the above to intersect with the optical axis La either before or after the projection lens 14. With this, above the optical axis La in the setting range Sr, the upper lens portion 31 evenly diffuses, in the upper-lower direction, the light from the light source 21 passing through the upper lens portion 31; meanwhile, as nearer to the optical axis La in the radial direction, the upper lens portion 31 condenses more rays of light. In FIG. 5, it appears that more light fluxes are condensed on the upper side, but this is because the light flux from the light source 21 is described according to the shape of the light condensing lens 12, and in reality, according to the above setting, more rays of light are condensed as nearer to the optical axis La.

As illustrated in FIG. 6, in the longitudinal cross-section illustrated above, the lower lens portion 32 condenses the light from the light source 21 so as to cause the light to intersect with the optical axis La. The lower lens portion 32 causes the light flux, of the rays of light from the light source 21, which passes through the position farthest away from the optical axis La in the radial direction, to intersect with the optical axis La at the most filter 13 side between the filter 13 and the projection lens 14. That is, concerning the light from the light source 21, the lower lens portion 32 causes the light flux, which passes through the farthest away position from the optical axis La, to intersect with the optical axis La at the nearest position, and causes the light flux nearer to the optical axis La, to intersect with the optical axis La at the position away from the filter 13. Then, the lower lens portion 32 causes the majority of the light fluxes, including the light flux near the optical axis La, to intersect with the optical axis La between the filter 13 and the projection lens 14. As long as causing at least the light flux passing through the position farthest away from the optical axis La to intersect, between the filter 13 and the projection lens 14, with the optical axis La, the lower lens portion 32 may cause any light flux other than the above to intersect with the optical axis La either before or after the projection lens 14. With this, below the optical axis La in the setting range Sr, the lower lens portion 32 evenly diffuses, in the upper-lower direction, the light from the light source 21 passing through the lower lens portion 32; meanwhile, as away from the optical axis La in the radial direction, the lower lens portion 32 condenses the light.

This light condensing lens 12, with the optical setting described above, causes the light from the light source 21 passing through the light condensing lens 12 to be irradiated to the filter 13 (filter 13L for the left side in the example illustrated in the figure) within the setting range Sr, as illustrated in FIG. 7. In that setting range Sr, according to the setting in the upper-lower direction in the light condensing lens 12 (its upper lens portion 31 and lower lens portion 32), the first to fourth slit portions 261, 262, 263, and 264 gradually change in brightness in the above order, so that the first slit portion 261 which becomes the farthest location is the brightest, and the fourth slit portion 264 which becomes the nearest location is the darkest, in the upper-lower direction. That is, the light condensing lens 12, in the upper-lower direction, makes the position where the first slit portion 261 which becomes the farthest location is provided the brightest (as a peak), while gradually darkening as away from there, thereby to irradiate an area within the setting range Sr with the light from the light source 21. Due to this, the light condensing lens 12, by condensing the light from the light source 21, gradually changes, in the longitudinal cross-section of the filter 13, that is, in the upper-lower direction, the brightness across the optical axis La so as to make the farthest location brightest and the nearest location darkest.

Further, in the setting range Sr, with the setting in the transverse cross-section (width direction) in the light condensing lens 12, the brightness in the width direction is made substantially uniform at each slit portion 26, that is, at each position in the upper-lower direction. That is, the light condensing lens 12, in the width direction, diffuses the light in a manner not to cause a difference in brightness compared to in the upper-lower direction, and causes the light from the light source 21 to irradiate within the setting range Sr. And, since the setting range Sr is set as described above, the irradiation slit 25 (each slit portion 26) can be irradiated in a similar light flux distribution even when either of the filters 13R or 13L of the left or right side is used. The light transmitted through the filter 13, that is, each slit portion 26 which is deemed as the light flux distribution is projected on the road surface 2 by the projection lens 14.

Figure 8:
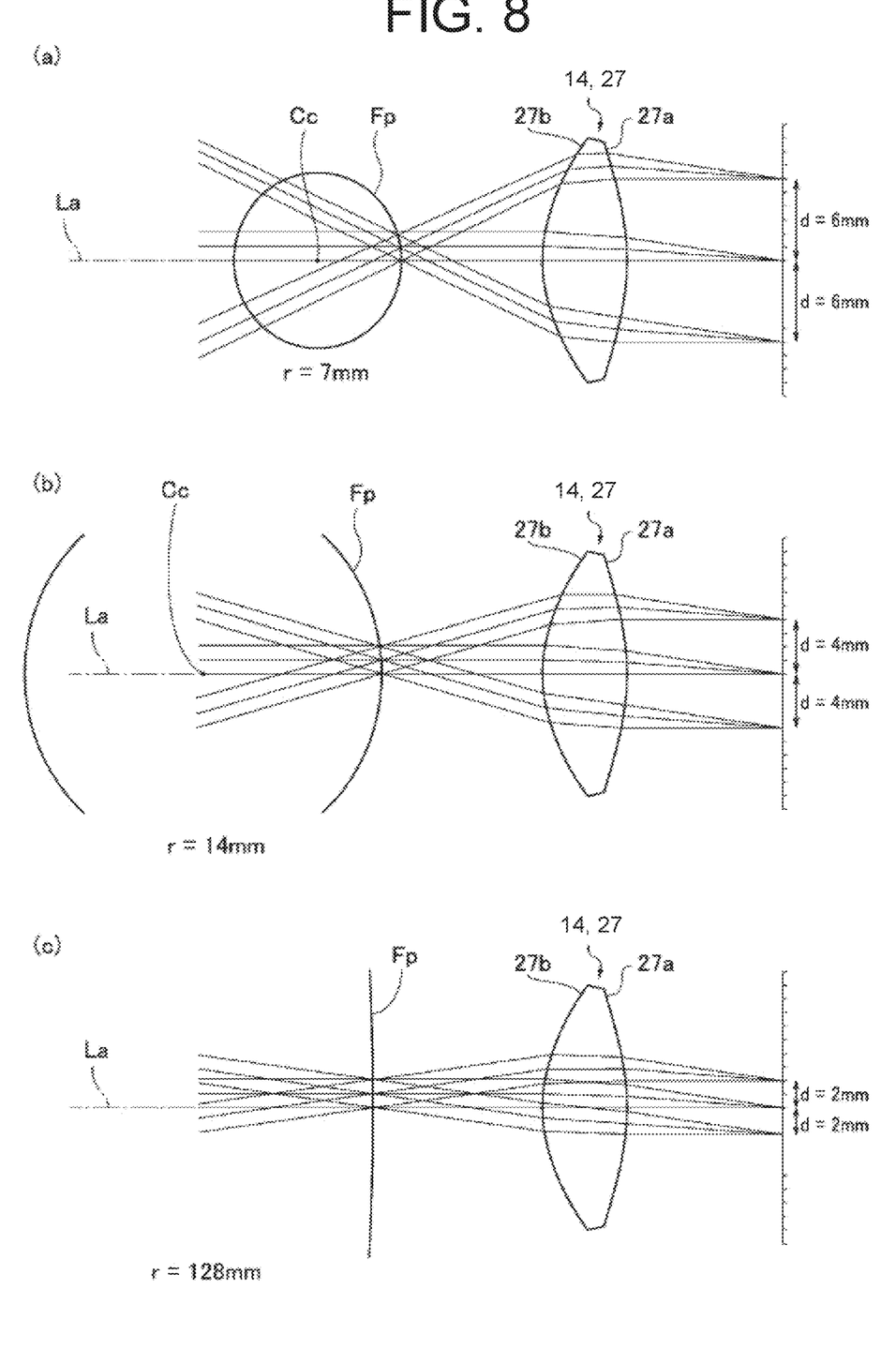
FIG. 8 is an explanatory view illustrating the relation of a focal plane relative to the parallel rays of light from the filter in a projection lens.

Next, the optical setting of the projection lens 14 will be described using FIG. 8. In FIG. 8, (a) illustrates the case of the emission from a radial position of 6 mm, (b) illustrates the case of the emission from a radial position of 4 mm, and (c) illustrates the case of the emission from a radial position of 2 mm. The lens body portion 27 (projection lens 14) sets a focal plane Fp, as illustrated in FIG. 8. The focal plane Fp is a plane on which a point for condensing parallel rays of light from on the optical axis La and from a radial position d, which is defined as a predetermined interval and from the optical axis La in the radial direction, is located, at a position in the optical axis direction where the filter 13 is provided (the plane indicated by a sign 13). The radial position d is the position in all radial directions, up, down, left, and right, with respect to the optical axis La, and the lens body portion 27 is similarly set in any direction orthogonal to the optical axis La. The lens body portion 27 is set so that as the radial position d becomes larger, a curvature radius r of the focal plane Fp becomes smaller that is, the curvature of the focal plane Fp becomes larger. Then, the lens body portion 27 sets the curvature center Cc (described at the top and in the middle) on the opposite side to the filter 13 (on the left of the focal plane Fp in FIG. 8) relative to the focal plane Fp, regardless of the radial position d, and makes the focal plane Fp convex toward the projection lens 14 side. That is, the lens body portion 27 does not reverse the convex direction of the focal plane Fp even when the radial position d changes.

The lens body portion 27 of Example 1 sets the focal plane Fp as follows as an example. The lens body portion 27 has the curvature radius r of the focal plane Fp of about 7 mm for the parallel rays of light emitted from the radial position d of 6 mm and from on the optical axis La, as illustrated at the top of FIG. 8. Further, the lens body portion 27 has the curvature radius r of the focal plane Fp of about 14 mm for the parallel rays of light emitted from the radial position d of 4 mm and from on the optical axis La, as illustrated in the middle of FIG. 8. Then, the lens body portion 27 has the curvature radius r of the focal plane Fp of about 128 mm for the parallel rays of light emitted from the radial position d of 2 mm and from on the optical axis La, as illustrated at the bottom of FIG. 8. When the lens body portion 27 reduces the curvature radius r of the focal plane Fp as the radial position d increases, it is sufficient that the value of the curvature radius r relative to the radial position d is appropriately set, and the lens body portion 27 is not limited to the configuration of Example 1. In particular, the lens body portion 27 has the above setting of the focal plane Fp (relation between the radial position d and the curvature radius r), at a position (outside the near-axis area) where the radial position d is larger than the near-axis area (less than 2 mm at the radial position d in Example 1). With this, the lens body portion 27 can suppress blurring by clarifying a contour of the irradiation pattern Pi with almost no change compared to the case where the lens body portion 27 is set on the entire surface including the near-axis area, thus making an efficient optical setting.

Figure 9:
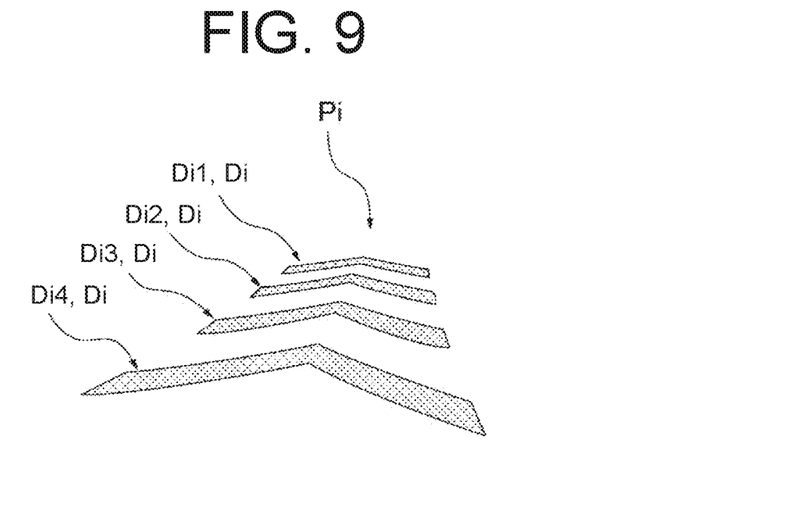
FIG. 9 is an explanatory view illustrating a irradiation pattern projected on a screen.
Figure 10:
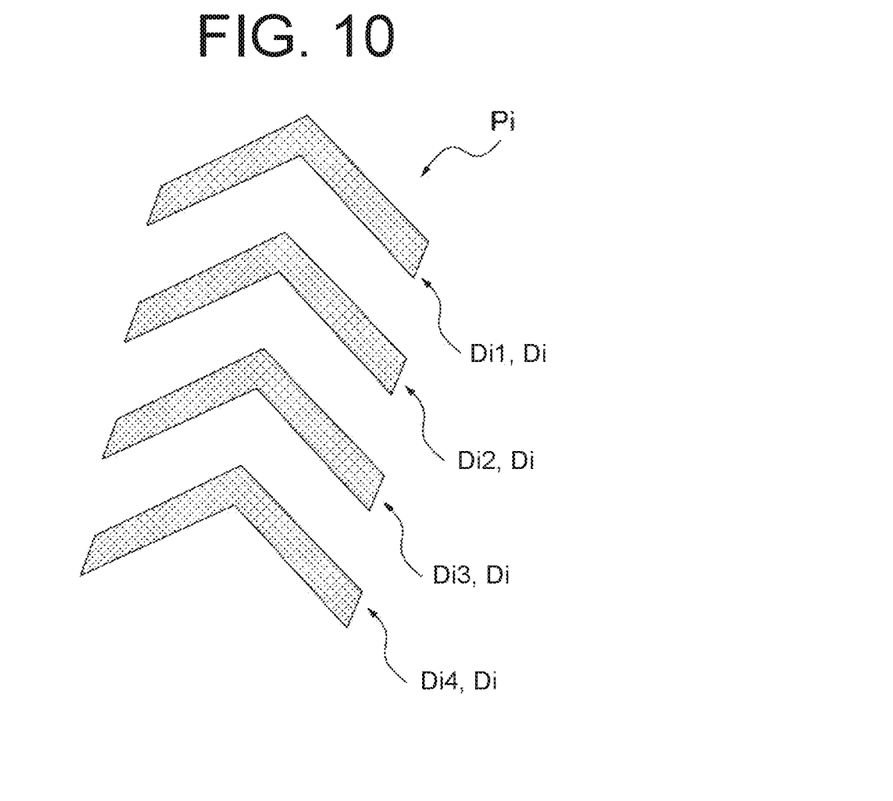
FIG. 10 is an explanatory view illustrating the irradiation pattern projected on a road surface.

The projection lens 14 projects the irradiation slit 25 (each slit portion 26 thereof) of the filter 13 which is defined as the light flux distribution described above, thereby to form the irradiation pattern Pi, as illustrated in FIGS. 9 and 10. FIG. 9 illustrates the irradiation pattern Pi formed on a screen arranged orthogonally to the optical axis La, and FIG. 10 illustrates the irradiation pattern Pi formed on the road surface 2 inclined relative to the optical axis La. The contour of the irradiation pattern Pi is made clear on the screen, thus suppressing the blurring. This is due to the fact that setting the projection lens 14 (lens body portion 27) as described above can reduce the effect of an image face curve of the projection lens 14.

In addition, the contour of the irradiation pattern Pi is clear on the road surface 2 as well, thus preventing the blurring. This is due to the fact that setting the projection lens 14 (lens body portion 27) as described above can reduce the effect that the distance to the road surface 2 changes due to the inclination of the road surface 2 relative to the optical axis La.

In particular, in the vehicle light 10 of Example 1, since the light source 21 is a monochromatic light, the effect of chromatic aberration in the projection lens 14 can be greatly suppressed. Due to this, the projection lens 14 can form the irradiation pattern Pi with a clear contour and suppressed blurring.

Figure 11:
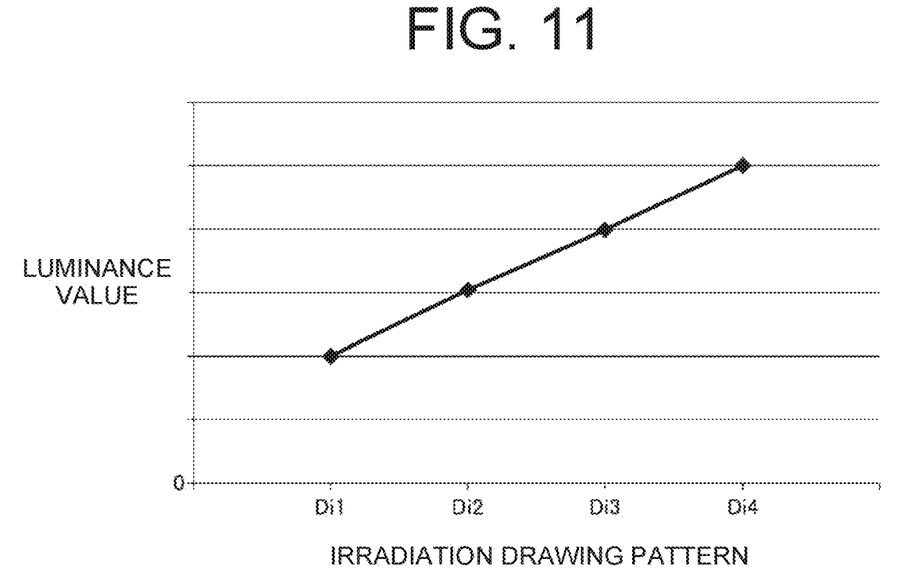
FIG. 11 is a graph illustrating the luminance of each irradiation drawing pattern Di in the irradiation pattern projected on the road surface, illustrating the luminance value on the longitudinal axis and each irradiation drawing pattern Di (its position) on the horizontal axis.

In this irradiation pattern Pi, each irradiation drawing pattern Di, on the road surface 2, is set to the luminance value illustrated in FIG. 11. FIG. 11 illustrates the luminance values in the vicinity of the V-shaped vertex in each irradiation drawing pattern Di. In FIG. 11, the luminance values on the longitudinal axis are logarithmic because it is generally known that the sense of brightness is proportional to the logarithm of luminance. As illustrated in FIG. 11, the irradiation pattern Pi is logarithmically linear in the degree of change in brightness relative to the change in distance from the vehicle 1, with the first irradiation drawing pattern Di1 farthest from the vehicle 1 being the darkest and the fourth irradiation drawing pattern Di4 nearest to the vehicle 1 being the brightest. That is, in the irradiation pattern Pi, each irradiation drawing pattern Di is arranged at an equal interval from each other, and the brightness is linearly increased in the order of the first irradiation drawing pattern a1, the second irradiation drawing pattern Di2, the third irradiation drawing pattern Di3, and the fourth irradiation drawing pattern Di4.

To explain this operation, a vehicle light of a comparative example is used. The vehicle light of the comparative example shall be the same in configuration as the vehicle light 10, and the setting range Sr of the filter 13, that is, each slit portion 26, shall be irradiated at uniform brightness with the light that is from the light source 21 and passed through the light condensing lens 12. The vehicle light of the comparative example is similar to the vehicle light 10 of Example 1 in that at the projecting on the road surface 2, it becomes darker in the order from the fourth irradiation drawing pattern Di4 at the nearest location to the third irradiation drawing pattern Di3, the second irradiation drawing pattern Di2, and the first irradiation drawing pattern Di1, but the change is not linear and it darkens rapidly nearer to the farthest location (the first irradiation drawing pattern Di1). This is due to the fact that in the irradiation pattern Pi projected by the projection lens 14, the brightness changes in proportion to the square of the distance from the projection lens 14 to the projection face (in this example, the road surface 2). Due to this, the vehicle light of the comparative example deteriorates the visibility of the farthest location (first irradiation drawing pattern Di1), and gives the viewer a sense of discomfort due to the rapid change in brightness.

Contrary to this, in the vehicle light 10 of Example 1, the light from the light source 21 irradiates the filter 13 in a manner to gradually change the brightness of the setting range Sr of the filter 13 in the order of the first to fourth slit portions 261, 262, 263, 264 so that the first slit portion 261 is the brightest and the fourth slit portion 264 is the darkest.

That is, the vehicle light 10 brightens the first slit portion 261 most that corresponds to the first irradiation drawing pattern Di1 at the farthest location and darkens the fourth slit portion 264 most that corresponds to the fourth irradiation drawing pattern Di4 at the nearest location, contrary to the brightness in each irradiation drawing pattern Di of the irradiation pattern Pi. Then, the vehicle light 10, by setting the brightness in the filter 13, can mitigate the rapid change in brightness caused by the change in distance attributable to projection on the road surface 2 by the projection lens 14, thus making it possible to linearize the change in brightness of each irradiation drawing pattern Di. Due to this, the vehicle light 10 can ensure the visibility of the farthest location (the first irradiation drawing pattern Di1), and can suppress a sense of discomfort of the viewer by making the linear change in brightness.

Figure 12:
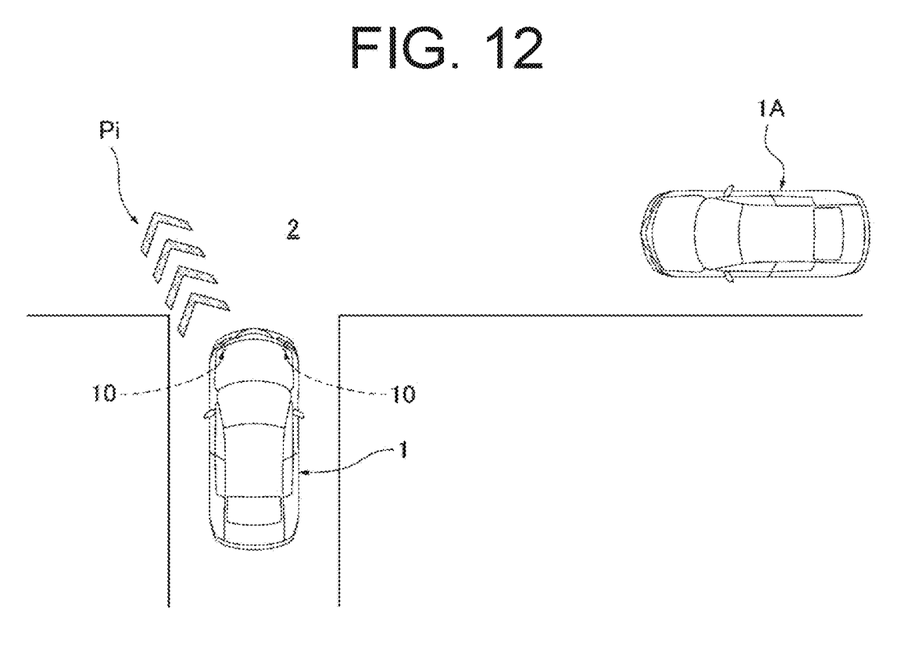
FIG. 12 is an explanatory view illustrating an example of using the irradiation pattern formed at the vehicle light.

Next, the operation of this vehicle light 10 will be described using FIG. 12. The vehicle light 10 is interlocked with the turn lamp, and when any of the left and right turn lamps is turned on, the light source 21 of the one on the turned-on side is turned on thereby to form the irradiation pattern Pi on the road surface 2. For example, the example illustrated in FIG. 12 illustrates a scene in which the vehicle 1 is coming out of an alley with poor visibility and is about to turn left. In the vehicle 1, the turn lamp on the left side is flashed, and thereby the vehicle light 10 installed on the front left forms the irradiation pattern Pi on the road surface 2. Then, the driver of a vehicle 1A proceeding from the right side in front view of FIG. 12 can see the irradiation pattern Pi formed on the road surface 2, even if the driver cannot see the vehicle 1.

Further, in the vehicle 1, the left and right vehicle light rays 10 are interlocked with the turn lamps, so that when a hazard lamp is turned on, the left and right vehicle light rays 10, two in number, simultaneously form the irradiation patterns Pi on the road surface 2 (see FIG. 1). Due to this, the vehicle light 10 can make a person around the vehicle 1 more reliably aware that the hazard lamp is turned on, compared to the case where only the left and right turn lamps are blinking.

The vehicle light 10 of Example 1 can obtain each of the following operational effects.

The vehicle light 10 is provided with the light condensing lens 12 that condenses the light emitted from the light source 21, the filter 13 provided with the irradiation slit 25 that partially transmits the light condensed by the light condensing lens 12, and the projection lens 14 that projects the light through the filter 13 thereby to form the irradiation pattern Pi. In the vehicle light 10, the light condensing lens 12, on the filter 13, brightens the farthest location of the irradiation slit 25 most and darkens the nearest location of the irradiation slit 25 most in the upper-lower direction, and diffuses the light emitted from the light source 21 more in the width direction than in the upper-lower direction. Due to this, by setting the brightness in the filter 13, the vehicle light 10 can mitigate the rapid change in brightness caused by the change in the distance from the projection lens 14 to the projection face. With this, in the vehicle light 10, even when the optical axis La is provided in a manner to be inclined relative to the road surface 2, the brightness distribution in the irradiation pattern Pi can be made as desired by the light condensing lens 12 setting the brightness on the filter 13. And, since the vehicle light 10 makes the irradiation pattern Pi a desired luminance distribution by means of the light condensing lens 12 which is composed of the single incident face 12a and the emission face 12b, and the projection lens 14 which is composed of the single emission face 27b and the incident face 27a, the vehicle light 10 can be easily configured.

The vehicle light 10 has a plurality of irradiation drawing patterns Di in which the irradiation patterns Pi are arranged, and the irradiation slit 25 has the slit portion 26 that individually corresponds to the irradiation drawing patterns Di. With this, the vehicle light 10 can make each irradiation drawing pattern Di at a desired brightness by setting the brightness of each slit portion 26 with the light condensing lens 12, making it possible to improve the visibility of the irradiation pattern Pi.

Further, in the vehicle light 10, the light condensing lens 12, on the filter 13, diffuses the light from the light source 21 within the setting range Sr where the slit portion 26 is provided in the width direction. Due to this, the vehicle light 10, as long as within the setting range Sr, can make the similar light flux distribution even if the position of each slit portion 26 is changed, for example, by using the left and right filters 13 in which the irradiation slits 25 (each slit portion 26) are provided symmetrical with respect to the plane orthogonal to the width direction in Example 1. With this, the vehicle light 10 can have a simple configuration while increasing the versatility.

In the vehicle light 10, a plurality of slit portions 26 are arranged in the upper-lower direction, with the nearest location being the upper side and the farthest location being the lower side, in the irradiation slit 25. Further, in the vehicle light 10, the slit portion 26 is made smaller from the nearest location to the farthest location, and the number of slit portions 26 located below the optical axis La is larger than the number of slit portions 26 located above the optical axis La. Then, the vehicle light 10 is composed of the upper lens portion 31 and the lower lens portion 32 in the upper-lower direction. Additionally, in the vehicle light 10, the upper lens portion 31 causes at least the light flux near the optical axis La to intersect with the optical axis La between the slit portion 26 and the projection lens 14, and the lower lens portion 32 causes the light flux, which passes through the position farthest from the optical axis La, to intersect with the optical axis La on the most slit portion 26 side between the slit portion 26 and the projection lens 14. Due to this, even when the vehicle light 10 is provided with the optical axis La inclined relative to the road surface 2, the vehicle light 10 can make the plurality of irradiation drawing patterns Di of equal size and make each of them have a desired brightness. In addition, since the vehicle light 10 has a larger number of slit portions 26 on the lower side, which is the farthest location, than on the upper side, which is the nearest location, all the slit portions 26 can be put within an equal range from the optical axis La in the radial direction, thus making it possible to efficiently use the light from the light source 21.

Concerning the vehicle light 10, in the projection lens 14, the focal plane Fp for the parallel rays of light from the filter 13 has the curvature radius that decreases as away in the radial direction from the vicinity of the optical axis La. Due to this, the vehicle light 10 can project the filter 13 (irradiation slit 25 (each slit portion 26)) on the road surface 2 by reducing the effect of the image face curve of the projection lens 14 even when the optical axis La is provided in a manner to be inclined relative to the road surface 2, and can form the irradiation pattern Pi on the road surface 2 with a clear contour and suppressed blurring.

In the vehicle light 10, the focal plane Fp has the curvature center Cc set on the opposite side to the filter 13 regardless of the distance from the optical axis La in the radial direction. Due to this, the vehicle light 10 can form the irradiation pattern Pi on the road surface 2 with a clearer contour and more suppressed blurring, even when the optical axis La is provided in a manner to be inclined relative to the road surface 2.

Accordingly, the vehicle light 10 of Example 1 as the vehicle light according to the present disclosure can make the luminance distribution in the irradiation pattern Pi as desired while having the simple configuration.

Although the vehicle light of the present disclosure has been described above based on Example 1, the specific configuration is not limited to Example 1, and design changes, additions, and the like are allowed as long as they do not depart from the gist of the invention pertaining to each claim of the scope of the patent claims.

Further, in Example 1, the irradiation pattern Pi is constituted by aligning four irradiation drawing patterns Di at substantially equal intervals in the direction away from the vehicle 1. However, provided that the irradiation pattern Pi is formed on the road surface 2 around the vehicle 1 and is the one that informs any person around the vehicle 1 of some intention of the driver, such as the one indicating the turn lamp and the hazard lamp in Example 1, the pattern and the like may be anything as long as being set as appropriate and is not limited to the configuration of Example 1. For example, the irradiation pattern Pi may be formed by the single irradiation drawing pattern Di, or may be formed by respective irradiation drawing patterns Di having different patterns from each other, or may vary in size and pattern in the arrangement order.

Further, in Example 1, in order to make the light condensing lens 12 corresponding to the left and right filters 13R and 13L, the light condensing lens 12 diffuses the light from the light source 21 within the setting range Sr in which each slit portion 26 is provided in the width direction. However, the light condensing lens 12 is not limited to the configuration of Example 1, as long as the light condensing lens 12 diffuses the light in the width direction thereby to make the luminance of the light, which transmits through each slit portion 26, substantially equal. As an example of this, the light condensing lens 12 may be one that diffuses, in the width direction, the light from the light source 21 within the slit portion 26 of the filter 13 on any one of left and right sides, that is, may be one that condenses the light to a range caused to match the size of the slit portion 26 in the width direction and meanwhile that diffuses the light in the range, and is not limited to the configuration of Example 1. In this way, when the light is condensed in the range of the slit portion 26 in the width direction, the light condensing lens 12 can gradually perform the brightening in the order of the fourth to first slit portions 264, 263, 262, 261 more efficiently because the slit portion 26 is made smaller as the slit portion 26 approaches the farthest location.

Further, in Example 1, in each slit portion 26, the brightness in the width direction is made substantially uniform. However, the brightness in the width direction at each slit portion 26 may be anything as long as being appropriately set and is not limited to the configuration of Example 1. For example, in each slit portion 26, the vicinity of the apex that is made into the V-shape can be brightened. In this case, in the transverse cross-section, within the range from the emission face 12b to the filter 13, the light condensing lens 12 shall, concerning the light from the light source 21, with the light flux passing near the optical axis La in the radial direction being parallel, diffuses the light flux outside of it in the radial direction, and parallelizes the light flux passing through the position away from the optical axis La in the radial direction. In this way, the irradiation pattern Pi can emphasize the way in which the four irradiation drawing patterns Di point the direction of being arranged on a substantially straight line.

In Example 1, in the light condensing lens 12, the upper lens portion 31 and the lower lens portion 32 are set in the upper-lower direction around the optical axis La. However, as long as the light condensing lens 12 has the upper lens portion 31 set on the upper side and the lower lens portion 32 set on the lower side in the upper-lower direction, the respective positions can be set as appropriate, and are not limited to the configuration of Example 1.

DESCRIPTION OF REFERENCE NUMERALS 10 vehicle light
12 light condensing lens
13 filter
14 projection lens
21 light source
25 irradiation slit
26 slit portion
31 upper lens portion
32 lower lens portion
Cc curvature center
d radial position
Di irradiation drawing pattern
Fp focal plane
La optical axis
Pi irradiation pattern
r curvature radius
Sr setting range

The invention claimed is:

1. A vehicle light comprising:
a light source;
a light condensing lens that condenses a light emitted from the light source;
an irradiation pattern forming member that has an irradiation slit for allowing the light, which is condensed by the light condensing lens, to partially pass through, and that forms the passing light into an irradiation pattern; and
a projection lens that projects the irradiation pattern, which is formed by the irradiation pattern forming member, onto a road surface wherein
the irradiation slit has a farthest location that corresponds to a farthest portion projected at a farthest position in the irradiation pattern and a nearest location that corresponds to a nearest portion projected at a nearest position in the irradiation pattern, and
the light condensing lens, on the irradiation pattern forming member, makes the farthest location brightest and the nearest location darkest in an upper-lower direction, and diffuses the light emitted from the light source more in a width direction, which is orthogonal to an optical axis direction and to the upper-lower direction, than in the upper-lower direction.

2. The vehicle light according to claim 1, wherein the irradiation pattern has a plurality of arranged irradiation drawing patterns, and
the irradiation slit has slit portions that individually correspond to the irradiation drawing patterns.

3. The vehicle light according to claim 2, wherein the light condensing lens, on the irradiation pattern forming member, diffuses the light from the light source within the slit portions in the width direction.

4. The vehicle light according to claim 2, wherein the light condensing lens, on the irradiation pattern forming member, diffuses the light from the light source within a setting range where the slit portions is provided in the width direction.

5. The vehicle light according to claim 2, wherein in the irradiation slit, a plurality of the slit portions are arranged in the upper-lower direction with the nearest location being an upper side and the farthest location being a lower side, the slit portions are reduced in size from the nearest location to the farthest location, and the slit portions located below an optical axis are larger in number than the slit portions located above the optical axis, the light condensing lens includes an upper lens portion and a lower lens portion in the upper-lower direction, the upper lens portion causes at least a light flux near the optical axis to intersect with the optical axis between the slit portions and the projection lens, and the lower lens portion causes a light flux, which passes through a position farthest from the optical axis, to intersect with the optical axis on the most slit portions side between the slit portions and the projection lens.

6. The vehicle light according to claim 1, wherein in the projection lens, a focal plane relative to parallel rays of light from a radial position that is defined as a predetermined interval in a radial direction from the optical axis in the irradiation pattern forming member has a curvature radius that decreases as the radial position increases.

7. The vehicle light according to claim 6, wherein the focal plane has a curvature center set on an opposite side to the irradiation pattern forming member regardless of the radial position.

8. The vehicle light according to claim 1, wherein the irradiation pattern forming member includes a filter.

* * * * *